United States Patent [19]

Fillman et al.

[11] 4,087,876
[45] May 9, 1978

[54] PORTABLE DOCK PLATE

[75] Inventors: Russell L. Fillman, Mitchellville, Iowa; Young Z. Yoon, Indianapolis, Ind.

[73] Assignee: Woodford Manufacturing Company, Des Moines, Iowa

[21] Appl. No.: 783,617

[22] Filed: Apr. 1, 1977

[51] Int. Cl.² .............................................. E01D 1/00
[52] U.S. Cl. ................................................... 14/72.5
[58] Field of Search .............................. 14/72.5, 69.5

[56] References Cited

U.S. PATENT DOCUMENTS

| 2,597,213 | 5/1952 | Whiteman | 14/72.5 |
| 2,739,325 | 3/1956 | Grace | 14/69.5 |
| 2,829,390 | 4/1958 | Noland | 14/72.5 |
| 2,880,431 | 4/1959 | Noland | 14/72.5 |
| 3,122,764 | 3/1964 | Ambli | 14/69.5 |
| 3,802,018 | 4/1974 | Miles | 14/72.5 |

FOREIGN PATENT DOCUMENTS 1,161,515    1/1964    Germany .............................. 14/72.5

Primary Examiner—Nile C. Byers
Attorney, Agent, or Firm—Zarley, McKee, Thomte, Voorhees & Sease

[57] ABSTRACT

A portable dock plate comprising a ramp with opposite sides and forward and rearward ends, a wheel assembly pivotally secured to the ramp and pivotal between portable and nonportable positions, a handle means secured to the wheel assembly at one side of said ramp and extending upwardly and rearwardly from the wheel assembly to terminate in a horizontal handle portion centrally positioned rearwardly of the ramp when the wheel assembly is in its portable position, and a dampener means on one side of said ramp interconnecting the ramp and the wheel assembly to retard the movement of the wheel assembly from a portable to a nonportable position.

9 Claims, 14 Drawing Figures

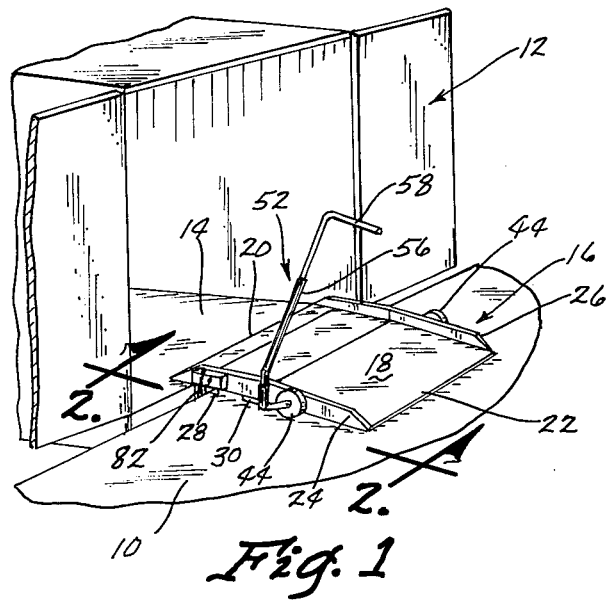
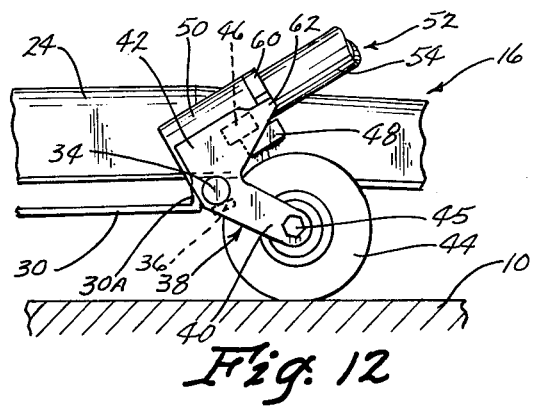
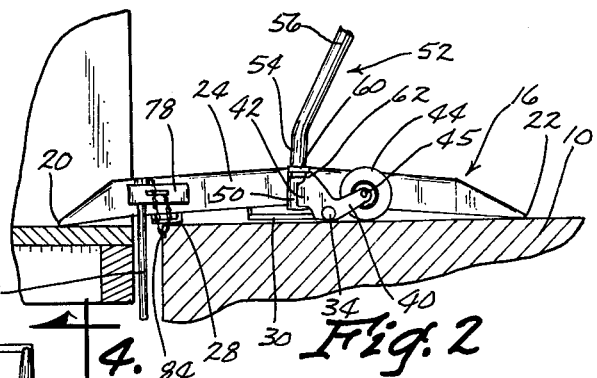
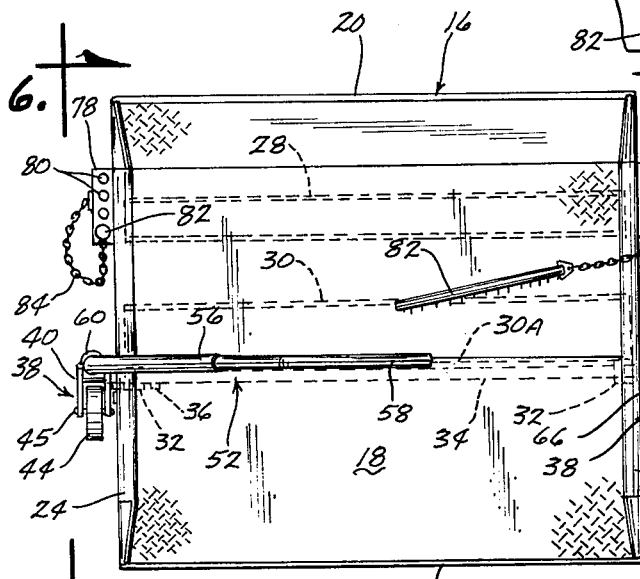
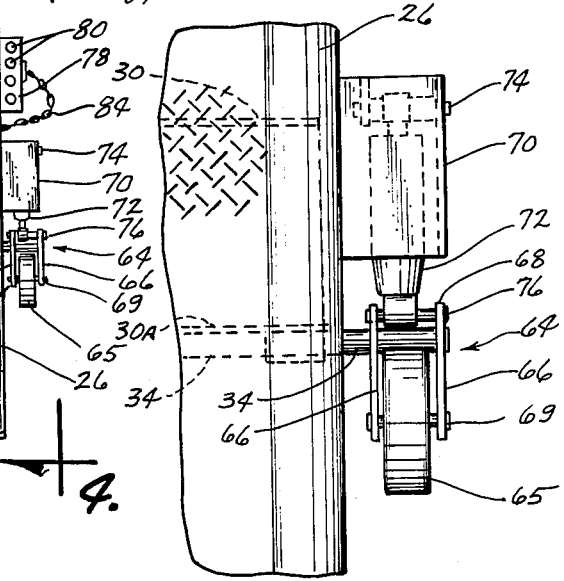
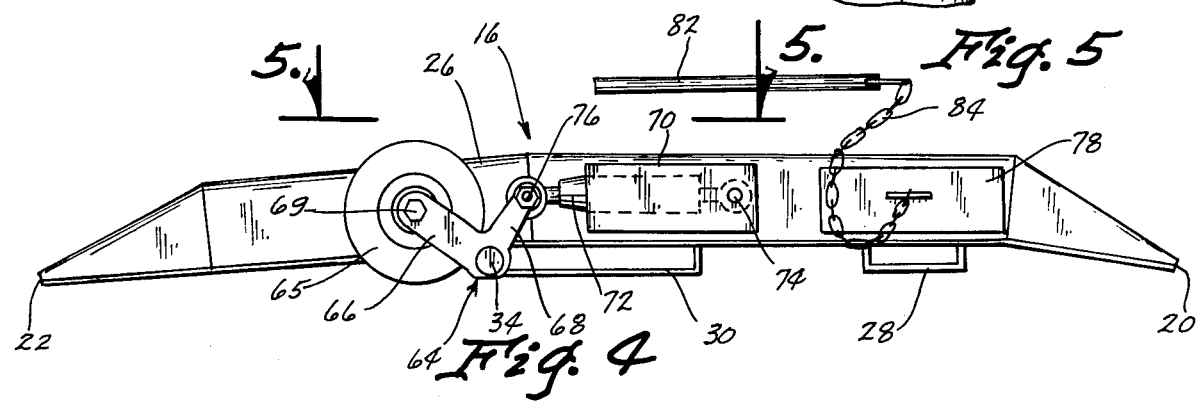

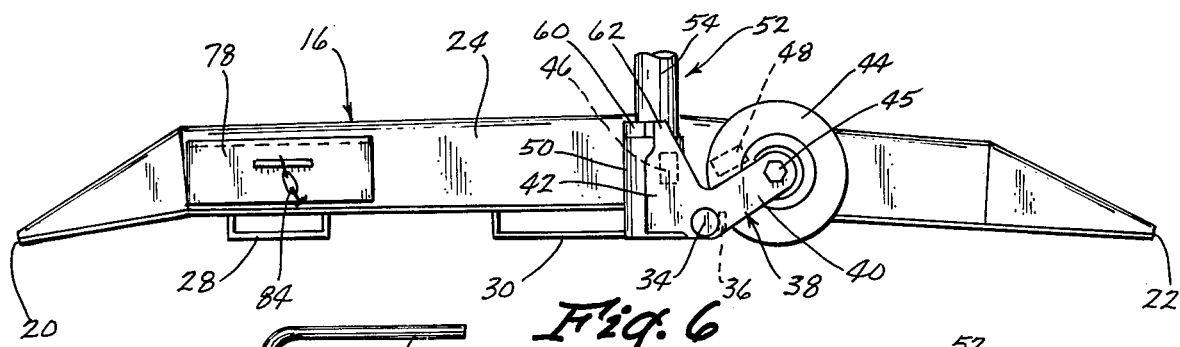
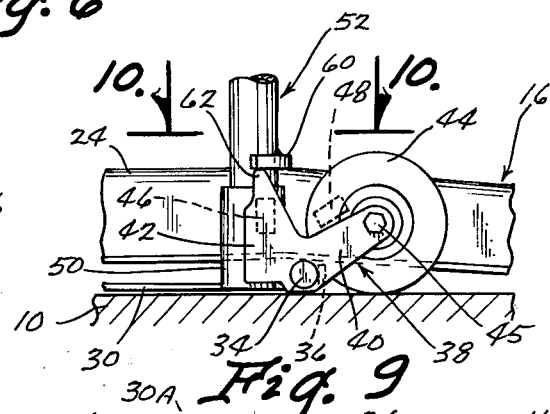
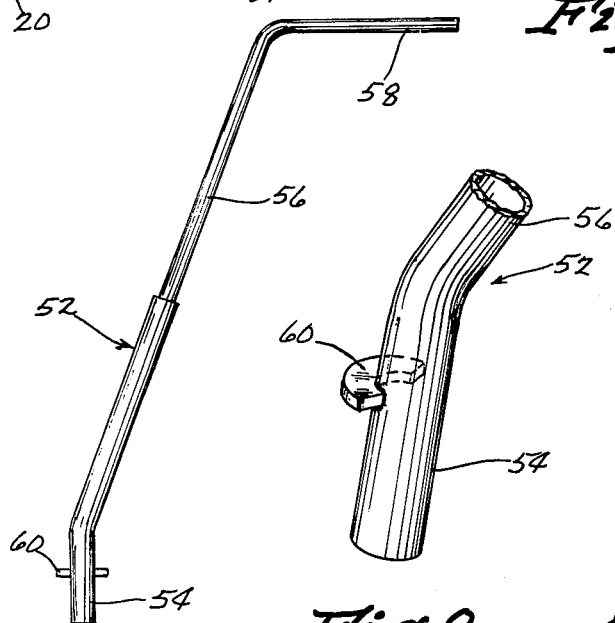
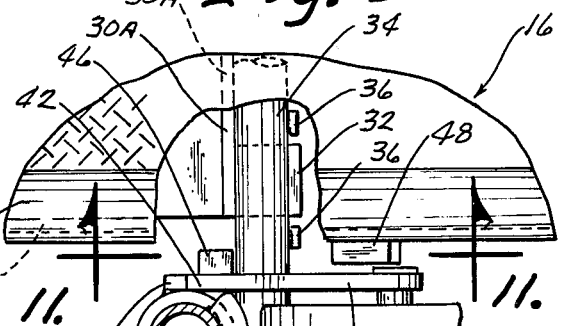
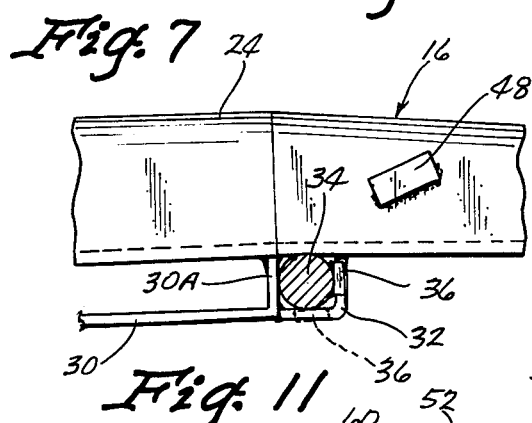
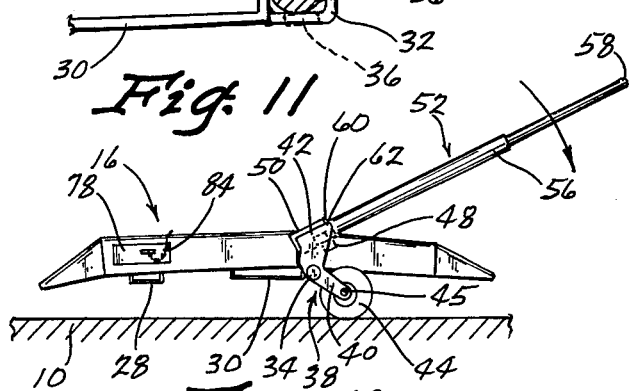
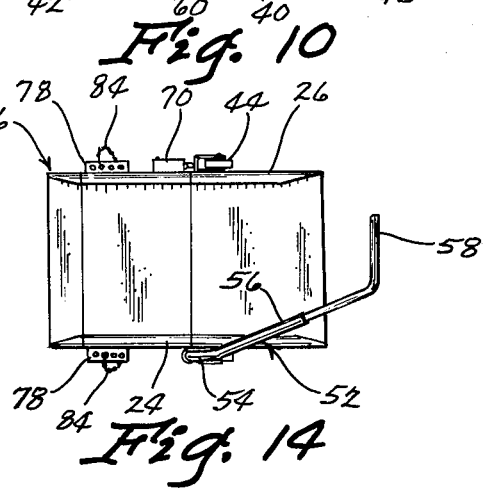

4,087,876

PORTABLE DOCK PLATE

BACKGROUND OF THE INVENTION

Typical portable dock plates are disclosed in U.S. Pat. Nos. 2,829,390 and 2,880,431 issued Apr. 8, 1958 and Apr. 7, 1959, respectively. These dock plates normally span the area between a loading dock and a truck or railroad car adjacent the dock. Such dock plates are of heavy construction and must be moved periodically as various vehicles are loaded or unloaded.

These heavy dock plates have been adapted for portable operation through the use of wheel assemblies and operating handles, as generally exemplified by the above two patents. One of the shortcomings of the prior art dock plates is that the great weight of the plates imposes substantial leverage on the operating handle when the plate is in its portable position. As a result, rapid rotational movement is imposed on the handle if the handle is inadvertently released by the operator while the dock is in its portable position. This phenomenon invites injury to persons operating around the dock plate.

Further, the handles of prior dock plates are not centrally located so as to give the operator efficient control over the movement and manipulation of the dock plate. Further, the handles of the prior art devices often interfere with the operation of the dock plate when the dock plate is in its nonportable operative position.

The device of this invention provides a portable dock plate which is easy to operate and which is very safe to use. The safety of the device of this invention is enhanced by the use of a shock absorber or dampener in conjunction with the wheel assembly which retards the movement of the wheel assembly from the portable to a nonportable position.

The handle device used on the instant dock plate is of a special configuration to permit the operator to be centrally located with respect to the plate when it is being moved so as to give him efficient control over the unit during the moving and manipulative functions. Further, the handle of the device of this invention can be easily removed from the unit or moved to an out-of-the way position.

The foregoing and other objects of this invention will be apparent to those skilled in the art.

BRIEF DESCRIPTION OF THE DRAWINGS

FIG. 1 is a perspective view of the device of this invention used on a dock from which a truck is being loaded or unloaded;

FIG. 2 is an enlarged scale partial sectional view of FIG. 1 taken on line 2 — 2 of FIG. 1;

FIG. 3 is a plan view of the device shown in FIG. 2;

FIG. 4 is an enlarged scale side elevational view of the device of FIG. 3 as seen on line 4 — 4 of FIG. 3;

FIG. 5 is an enlarged scale partial plan view of one side of the device of FIG. 4 as seen on line 5 — 5 thereof;

FIG. 6 is a side elevational view of the device of FIG. 3 as seen on line 6 — 6 of FIG. 3;

FIG. 7 is an elevational view of the handle removed from the dock plate;

FIG. 8 is an enlarged scale perspective view of the lower end of the handle;

FIG. 9 is a partial side elevational view of the dock plate similar to that of FIG. 6 but with the handle being moved upwardly into an inoperative position;

FIG. 10 is a partial plan view of the dock plate as seen on line 10 — 10 of FIG. 9;

FIG. 11 is a partial sectional view of the dock plate taken on line 11 — 11 of FIG. 10;

FIG. 12 is a partial side elevational view of the dock plate showing the wheel assembly in its portable position;

FIG. 13 is a side elevational view of the dock plate similar to that of FIG. 12 showing the entire device in its operative position; and FIG. 14 is a plan view at a reduced scale of the dock plate of FIG. 13.

DESCRIPTION OF THE PREFERRED EMBODIMENT

The numeral 10 designates a conventional, horizontal loading dock. A conventional truck 12 is shown to be parked in loading condition adjacent the dock. The numeral 14 designates the conventional truck deck onto which goods are to be loaded or from which goods are to be unloaded.

The numeral 16 generally designates the portable dock plate of this invention. Dock plate 16 includes a generally rectangular ramp 18 having forward and rearward ends 20 and 22, respectively, and sides 24 and 26. Channels 28 and 30 are welded to the underside of ramp 18. As seen in FIG. 11 an angle 32 is welded to the underside of ramp 18 adjacent flange 30A of channel 30 to form an enclosure for axle 34 which is rotatably mounted therein. Stops 36 (FIG. 10) are welded to axle 34 adjacent to angles 32 to limit the rotation of axle 34 as will be discussed hereafter. Stops 36 limit the lateral movement of axle 34.

A wheel bracket 38 is mounted on one end of axle 34 as shown in FIGS. 9 and 10. Bracket 38 includes arms 40 and 42 which extend outwardly from axle 34 at substantially right angles. A wheel 44 is rotatably mounted between arms 40 by means of shaft 45. A stop 46 is welded to the outside of the innermost arm 42 and is adapted to engage stop 48 which is welded to side 24 of the dock plate 16. The engagement of stops 46 and 48 limits the rotation of the axle and wheel brackets secured thereto which will hereinafter be referred to generally as the wheel assembly. As shown in FIG. 12, the engagement of stops 46 and 48 limit the rotation of the axle and wheel brackets 38 in one direction. Similarly, the engagement of stop 36 on axle 34 with the bottom of ramp 18 will limit the rotation of the axle in an opposite direction.

A substantially vertical sleeve 50 is welded or otherwise secured between the arms 52 of wheel brackets 38. The sleeve 50 dwells in a substantially vertical position when the dock plate 16 is in its operating or nonportable condition shown in FIGS. 6 and 9. The sleeve 50 is adapted to receive and support handle 52 which is comprised of a lower vertical portion 54, an intermediate diagonal portion 56, and a horizontal handle element 58. A crescent shaped cam 60 is welded to the lower vertical portion 54 of handle 52 as shown in FIG. 8. When handle 52 is in its lifting or operating position as shown in FIGS. 13 and 14, the cam 60 engages the finger 62 on the upper end of arm 42 of wheel bracket 38 as shown in FIG. 6.

Thus, when the handle 52 is moved downwardly by the operator as indicated by the arrow in FIG. 13, the cam 60 engages the finger 62 to pivot the wheel bracket 38 from the position shown in FIG. 6 to the position shown in FIG. 12. When it is desired to remove the handle from the position shown in FIG. 14 so as to clear the ramp for loading or unloading, and with the dock plate in its nonportable position shown in FIGS. 1, 4 and 6, the handle can be slidably moved upwardly a small increment out of sleeve 50 so that the cam 60 dwells above the finger 62 as shown in FIG. 9. This will permit the handle, including the horizontal portion 58 to dwell in a plane just outside the ramp as shown in FIG. 1.

A wheel bracket 64 is secured to the other end of axle 34 and is comprised of arms 66 and 68 which entend substantially at right angles with respect to each other. A wheel 65 is rotatably mounted between arms 66 by pin 69 as shown in FIG. 4.

A mounting bracket 70 is secured to side 26 of dock plate 16. A shock absorber 72 is positioned therein and is of conventional construction, preferably comprising a hydraulic cylinder and plunger. Shock absorber 72 is rotatably mounted to bracket 70 by means of pin 74 (FIG. 5) and the other end of the shock absorber is rotatably secured to the outer ends of arm 68 by means of pin 76. The shock absorber 72 dampens or retards the ability of the wheel bracket 64 to rotate in a clockwise direction as viewed in FIG. 4. This prevents the wheel assembly from suddenly collapsing from the position in FIG. 12 to the position in FIG. 4 if the operator releases the handle 52. Without shock absorber 72, the weight of the dock plate itself would cause a sudden collapse of the wheel assembly which might invite injury to the operator or others.

Brackets 78 are secured to the outside surfaces of the sides 24 and 26 adjacent the forward end of the ramp 18. Apertures 80 appear in the brackets 78 and are adapted to receive stabilizing bars 82 which are secured to the brackets 78 by chains 84. The bars 82 can be inserted into appropriate apertures 80 of the brackets 78 to stabilize the operative dock plate with respect to the dock and the truck to prevent sliding thereof as loading vehicles pass thereover. This arrangement is shown in FIG. 2. The brackets 78 and related structures are conventional in the art.

OPERATION

When the plate dock of this invention is in its storage position, the wheel assembly is in the general position shown in FIGS. 3, 4 and 6. If the handle 52 is not inserted in sleeve 50, this can easily be accomplished. The handle is rotated to the position shown in FIG. 3 so that the cam 60 engages finger 62 on arm 42 of wheel bracket 38 as shown in FIG. 6. This locates the horizontal upper portion 58 of the handle centrally over the ramp 18. The operator normally will place his foot on the reaward end 22 of the ramp 18 and will pull the handle 52 from the position shown in FIG. 3 to the position shown in FIGS. 13 and 14. This causes the wheel assembly to raise the ramp 18 to a position above a supporting surface wherein the entire unit is supported only on the wheels. The stops 46 and 48 engage each other as shown in FIG. 12 so as to limit the degree to which the handle can be lowered in this reverse direction. The unit is then pushed to the position where it is to be used as generally indicated in FIG. 1.

The operator then releases the downward pressure being exerted on handle 52, and the weight of the unit causes the wheel assembly to rotate to the nonoperative position shown generally in FIGS. 1, 2, 4 and 6. This places the handle in the position shown in FIG. 3. By raising the handle slightly to the position shown in FIG. 9, where the cam 60 clears the finger 62, the handle can then be rotated to the position of FIG. 1 where it is parallel to the side 24 of the unit. This frees the ramp 18 for ingress and egress to the truck 12.

It should be noted that when the downward pressure on the handle is reduced or released by the operator, when the handle is in the position of FIG. 13, the handle will move upwardly in a forward direction, but this movement will be retarded through the action of the shock absorber 72. While the shock absorber 72 does not materially affect the movement of the handle in the clockwise direction as viewed in FIG. 13, it does retard the counterclockwise movement of the handle. This is accomplished by appropriate bypass valves in the shock absorber which are conventional in the art. Further, the forward rotation of the handle is limited when the handle reaches the position shown in FIG. 3 by the engagement of stop 36 (FIG. 11) with the underside of the ramp 18. The combined efforts of the shock absorber 72 and the stop 36 results in a much safer dock plate because there is no possibility of any sudden action or movement of the handle to cause any injury.

The rods 82 can be inserted within the apertures 80 of brackets 78 in the manner described to stabilize the dock plate as is conventionally done in the art. As indicated heretofore, the handle 52 can be rotated to the position of FIG. 1 to be out of the way while the dock plate is being used, or the handle can be entirely removed from the unit.

From the foregoing, it is seen that this invention accomplishes at least all of its stated objectives.

What is claimed is:

1. A portable dock plate, comprising,
   a ramp having forward and rearward ends, and two sides, a wheel assembly having wheel means pivotally secured to the sides of said ramp and an axle means therebetween operationally connecting said wheel means of said sides,
   handle means secured to said wheel assembly and adapted to move said wheel assembly to a portable position in portable support of said ramp, and to a retracted nonportable position,
   said handle means being one handle secured to said wheel assembly at one side of said ramp, and extending upwardly and rearwardly when said wheel assembly is in its portable position, said handle means terminating in a horizontal portion centrally positioned rearwardly of said ramp when said wheel assembly is in its portable position.

2. The dock plate of claim 1 wherein said handle means is rotatable about a substantially vertical axis when said wheel assembly is in its nonportable position to permit the horizontal portion of said handle means to dwell in a position outside of the space above said ramp to permit freedom of movement across said ramp.

3. The dock plate of claim 1 wherein said handle means is removably secured to said wheel assembly.

4. The dock plate of claim 1 wherein stop means are secured to said ramp for limiting the downward movement of said handle means with respect to said ramp as said handle means extends upwardly and rearwardly.

5. The dock plate of claim 1 wherein stop means are secured to said wheel assembly and said ramp to limit the rotation of said handle means with respect to said ramp.

6. The dock plate of claim 1 wherein a dampener means is connected to said ramp and said wheel mechanism to retard the movement of said wheel assembly from said portable to said nonportable position.

7. The dock plate of claim 1 wherein said one handle is disposed with respect to said wheel assembly so that said handle is in a substantially vertical position when said wheel assembly is in its retracted non-portable position.

8. A portable dock plate, comprising,
 a ramp having forward and rearward ends, and two sides,
 a wheel assembly pivotally secured to the sides of said ramp,
 handle means secured to said wheel assembly and adapted to move said wheel assembly to a portable position in portable support of said ramp, and to a retracted nonportable position, and
 a dampener means connected to said ramp and said wheel mechanism to retard the movement of said wheel assembly and said handle means from said portable to said nonportable position.

9. The dock plate of claim 8 wherein said dampener means is a hydraulic cylinder.

* * * * *